July 6, 1965 K. A. SCHAFER 3,193,437
LAMINATED ARTICLES CONTAINING SHEETS OF FLEXIBLE FOAMED
PLASTICS AND METHOD FOR MAKING THE SAME
Filed July 19, 1961
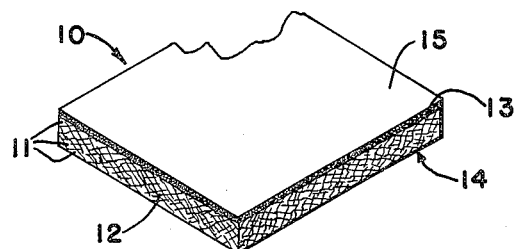
FIG. 1
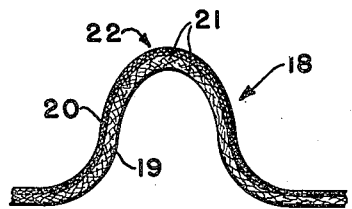
FIG. 2
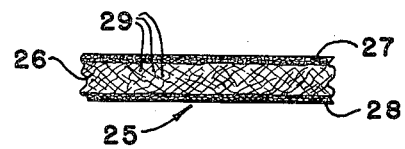
FIG. 3
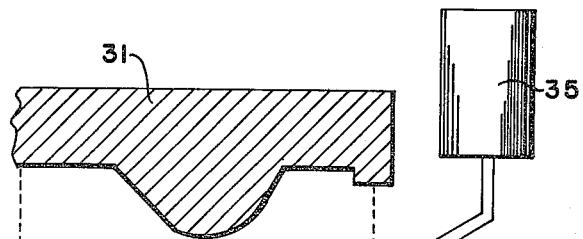
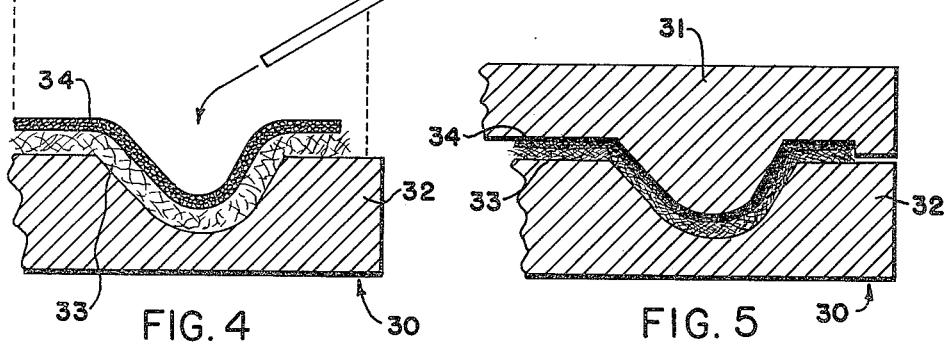
FIG. 4       FIG. 5
INVENTOR.
KENNETH A. SCHAFER
BY *Harry B. Keck*
ATTORNEY 3,193,437
LAMINATED ARTICLES CONTAINING SHEETS OF FLEXIBLE FOAMED PLASTICS AND METHOD FOR MAKING THE SAME
Kenneth A. Schafer, Cedarburg, Wis., assignor, by mesne assignments, to Freeman Chemical Corporation, Port Washington, Wis., a corporation of Delaware
Filed July 19, 1961, Ser. No. 125,272
13 Claims. (Cl. 161—89)

This invention relates to laminated plastic articles and especially to glass-fiber-reinforced laminated articles and a process of making the same. More particularly, this invention concerns the fabrication of glass-fiber-reinforced articles from unsaturated polyester resins particularly and thermosetting resins generally.

The term "unsaturated polyester resin" comprehends mixtures of polyesters which are formed from dihydric alcohols and unsaturated dicarboxylic acids or acid anhydrides. Suitable dihydric alcohols include the glycols such as propylene glycol. Suitable dicarboxylic acids include maleic and fumaric acid. Frequently some dicarboxylic acid or acid anhydride which is free of ethylenic unsaturation is included in the polyester such as phthalic acid, isophthalic acid and the like Where the acid anhydrides are available, they are usually employed in the production of the polyesters, e.g., maleic anhydride, phthalic anhydride. The ethylenic unsaturation in the resulting unsaturated polyester provides a polymerization site for crosslinking (thermosetting) of the material with a suitable polymerizable ethylenically unsaturated monomer such as styrene, vinyl toluene and the like The unsaturated polyester resin art is widely understood today.

Glass-fiber-reinforced polyester laminated articles are manufactured in substantial quantities in this country. Some of the articles of commerce which are fabricated from glass-fiber-reinforced polyesters include automobile parts such as fenders, moldings and the like, boat hulls, motor casings, machine casings, furniture, helmets, and the like.

One serious problem with glass-fiber-reinforced polyester laminated articles has been the poor wearing properties of the products in certain applications. The furniture application is a specific example. Through wear, some of the cured polyester resin on the furniture surface will abrade or wear away to expose the glass fibers of the laminates. These exposed glass fibers have substantially greater hardness and abrasion resistance than the resin and, by virtue of their fibrous composition, have a tendency to collect dust and dirt which undesirably accumulates over the surface of the furniture. Cleaning of the resultant soiled surface with abrasive cleaning compounds merely aggravates the condition by further abrading the resin and exposing greater quantities of the underlying glass fibers.

Various techniques have been attempted to resolve this abrasion problem. For example, sheets of paper have been applied over the glass fiber mats to serve as a barrier against exposure of the glass fibers. In some applications the paper has been found to be acceptable, but not where the article has compound curvature since paper will not conform to such surfaces. The standard practice today is to apply a glass-fiber "veil" over the glass-fiber mat to serve as a barrier against exposure of the stranded glass fibers of the mat. The fibers in the "veil" are generally unstranded and hence are less coarse than the stranded fibers of the mat. Like the glass-fiber mat, the "veil" is readily conformable to compound curvatures which are so frequently encountered in the glass-fiber-reinforced polyester laminate applications. It has been found, however, that surface abrasion of the resin will expose the fibers of the "veil" and create the described dirt-accumulation difficulties.

According to the present invention, I have provided a laminate which utilizes glass-fiber mats and thermosetting resins which avoids the glass-fiber exposure problems with their accompanying dirt accumulation difficulties. In addition, the present invention produces laminates which possess remarkable resistance to flexural cracking and crazing of the exposed surfaces. The appearance of the surface of the present laminates is most attractive, creating a general impression ranging from a marbleized finish to a fine leathery grain.

The present laminates are fabricated from at least two embedded layers:
(1) The glass-fiber mat which has been employed heretofore; and
(2) A thin resilient sheet of foamed plastic having connected open cells, flexibilityfi elasticity, compressibility and wettability for the liquid thermosetting resin.

The preferred foamed plastic material is foamed polyurethane which is available in a variety of sheet-thicknesses and in a variety of average cell diameter structures.

The foamed polyurethane sheet is applied over one surface of the glass-fiber mat or over both surfaces of the glass-fiber mat depending upon the exposure which the resultant article will encounter in its applications. In effect, the foamed polyurethane sheet replaces the "veil" heretofore employed. The foamed polyurethane, having connected open cells, behaves like a sponge for the liquid polyester resin and has the necessary wettability for the liquid resin. The foamed polyurethane is not only flexible but also elastic which permits the material to conform readily to compound curvatures of the molds which are utilized in the fabrication of reinforced glass-fiber laminated articles.

The foamed polyurethane normally is available in relatively thin sheets, ranging in thickness from about 0.05 to about 6.0 inches. The foamed polyurethane is highly compressible by virtue of its connected open cell structure. Sheets of foamed polyurethane having normal uncompressed thicknesses between 0.05 and 2.0 inches, for example, will be compressed and substantially flattened during the molding operations to a minute fraction of their normal, initial uncompressed thickness In the course of compression, the liquid polyester resin saturates the cellular structure and displaces air which normally fills the cells. The resultant surface presents to view a cellular configuration (which is the foamed polyurethane cell structure) marbleized with the polyester resin which extends throughout the interstices. By appropriate selection of colors of the foamed polyurethane, numerous attractive grained surface appearances can be produced.

I have further found that on flexure of the resulting laminated articles, there is a striking difference in the resistance of the exposed surface to cracking and crazing in contrast to that exhibited by the glass-fiber-reinforced polyester laminated articles heretofore available.

The principal object of this invention is to provide a laminated article having an improved surface appearance.

Another object of this invention is to provide glass-fiber-reinforced polyester laminated articles which resist abrasion and consequent dirt accumulation.

A further object of this invention is to provide glass-fiber-reinforced laminated articles which resist cracking and crazing under flexural stressing.

A still further object of this invention is to provide a relatively low-cost glass-fiber-reinforced polyester laminating process which can be readily adapted to the molding of articles having compound curvatures.

These and other objects and advantages of the present invention will become apparent from the following detailed description by reference to the accompanying drawings in which:

FIGURE 1 is a fragmentary view, partly in cross-section, of a laminated article according to a preferred embodiment of this invention;

FIGURE 2 is a cross-section illustration of a laminated article fragment fabricated according to this invention;

FIGURE 3 is a cross-section of a fragment of a laminated article fabricated according to an alternative embodiment of this invention;

FIGURE 4 is a cross-section illustration of a typical molding apparatus utilized in the fabrication of laminated articles from glass-fibers and liquid polyesters showing the assembly of the present laminate materials within a mold prior to curing; and FIGURE 5 is a cross-section illustration of the molding apparatus of FIGURE 4 after the mold has been closed and during the curing of the present laminated articles.

Referring to FIGURE 1, it will be seen that the present laminated article 10 is essentially a continuous body of thermoset polyester resin 11 in which is embedded a glass-fiber mat 12 and a sheet 13 of foamed polyurethane. On the undersurface 14 of the article 10 the glass-fiber mat abuts the surface and individual glass fibers can be exposed readily as the polyester resin film thereover is abraded away. Abrasion may result from actual erosion, as through normal wear, or may result from or be accelerated by repeated flexural stressing of the undersurface 14. The upper surface 15, however, has a sheet of foamed polyurethane in abutment. The foamed polyurethane is a flexible, elastic, highly compressible material having a connected, open cellular structure which is readily wettable by the liquid polyester resin. The foamed polyurethane 13 is compressed during the molding of the article 10 whereby its cellular configuration is presented over the entire upper surface 15 which is marbelized with the cured polyester resin. The resultant appearance of the upper surface 15 is akin to a fine-grain leather having a fairly hard surface. In general the actual hardness of the upper surface 15 will be less than that of the undersurface 14 where the same polyester resin 11 is utilized throughout the laminate. Barcol hardness values of perhaps 50 might be presented on the undersurface 14 whereas Barcol hardness values of zero through 40 might be presented on the upper surface 15.

When the laminated article 10 is flexed, surface cracks and crazings will appear over the undersurface 14 while the upper surface 15 will remain free of severe surface cracks and crazings.

As seen in FIGURE 2, a laminated article 18 having extreme compound curvature can be readily fabricated according to this invention. The foamed polyurethane sheet 20 and the glass-fiber mat 19 are connected and engulfed by the continuous thermoset polyester resin 21. The compressibility of the foamed polyurethane sheet 20 allows it to conform readily to any discontinuities of the glass-fiber mat 19. The flexibility and elasticity of the foamed polyurethane allows the sheet 20 to conform readily to extreme compound curvatures such as indicated by the numeral 22 in FIGURE 2.

The present laminated articles may be fabricated in the alternative form 25 seen in FIGURE 3 by sandwiching a glass-fiber mat 26 between two sheets 26, 27 of foamed polyurethane and filling the interstices of the article with polyester resin 29. Such articles will have the present desirable surface presentations over both of the flat surfaces thereof.

The fabrication of the present laminated articles will be described by reference to FIGURES 4 and 5 wherein a molding apparatus 30 is illustrated having an upper element 31 and a base element 32. While the molding apparatus 30 is separated, a glass-fiber mat 33 is placed in the base element 32 and conformed to the configuration thereof. Usually the glass-fiber mat 33 is provided in pre-shaped and pre-cut form to facilitate positioning within the base element 32. The preformed glass-fiber mat 33 may be precoated with a suitable sizing material to enhance its wettability with the polyester resin.

After the glass-fiber mat 33 has been positioned, a sheet 34 of foamed polyurethane is positioned thereabove and conformed to the configuration of the base element 32. In a typical molding application, the glass-fiber mat 33 may have an uncompressed thickness from 0.10 to 0.5 inch. The foamed polyurethane sheet 34 may have an uncompressed thickness from 0.05 to 0.5 inch. The sheet 34 of foamed polyurethane may be extended beyond the edges of the base element 32 or may be precut to the exact dimensions of the base element 32.

A predetermined quantity of unsaturated polyester resin is poured from a container 35 into the mold cavity formed by the base element 32 and is applied in a suitable geometric pattern over the base element 32 which will assure uniformity of distribution. In some instances, it may be desirable to apply initially a pre-coat of particular types of polyester resins to the base element 32. Thereafter polyester resin may be applied to the glass-fiber mat 33 prior to the positioning of the foamed polyurethane sheet 34 thereabove. When the foamed polyurethane sheet 34 is subsequently positioned over the resin-wetted glass-fiber mat 33, excess liquid resin may be absorbed to saturate the sheet 34 or additional liquid resin may be poured from the container 35 over the sheet 34.

As seen in FIGURE 5, the top mold element 31 is clamped to the base element 32 after the mold contents have been prepared. The base element 32 and the top mold element 31 constitute a first molding surface and a second molding surface respectively. The predetermined spacing between the top element 31 and the base element 32 establishes the thickness of the resultant laminated article. The glass-fiber mat 33 and the foamed polyurethane sheet 34 are compressed to the predetermined thickness. The mold apparatus 30 is exposed to a suitable heating regime to effect curing and thermosetting of the polyester resin confined therein.

Where the polyurethane sheet 34 is permitted to extend over the edges of the base element 32 (instead of being precut to the dimensions of the base element 32), the upper mold element 31 may be adapted to trim off the rim-extending portions of the sheet 34 during the assembly of the molding apparatus in accordance with conventional molding practices.

*Examples*

Typical laminates according to this invention have been fabricated from conventional glass-fiber mats and conventional unsaturated polyester resins by utilizing in addition sheets of foamed polyurethane. Where relatively large celled foamed polyurethane is provided, the surface presentation is highly marbelized, e.g., cells having an average diameter of about 0.1 inch. Where relatively small-celled foamed polyurethane is provided, the resulting surface presentation is extremely fine-grained and appears to be similar to fine-grained leather where the cells have an average diameter of 0.02 to 0.05 inch. In general, the foamed polyurethane should have a fairly uniform cellular size ranging in average diameter from about 0.001 to 0.5 inch. Where large celled foamed polyurethane is utilized, greater thicknesses of the sheets may be required. Articles having foamed polyurethane with 10, 20, 30 and 45 average cells per inch have been fabricated into excellent reinforced articles having a thickness, when cured, of about 0.15 inch.

The surfaces of the present laminates are quite smooth and will accept surface coatings in the form of paints, lacquers and plastic films readily in contrast to the relative difficulty in providing surface coatings to the glass-fiber-reinforced laminated articles heretofore available.

Where it is desirable for aesthetic reasons to retain the pattern of the glass-fiber mat in the surface of the resulting laminated article, extremely thin sheets of the present foamed polyurethane resin can be employed to allow the glass-fiber pattern to show over the surface of the article. Because of the great compressibility of the foamed polyurethane, the relatively harder glass fibers will indeed distort extremely thin sheets of the material and create an impression on the external surface.

While connected cells are preferred in the foamed polyurethane, it is also possible to use foamed polyurethane having discrete closed cell structures provided that at least a portion of the cells are broken over the outboard surface of the foamed polyurethane to provide a smooth surface presentation. The compression of the closed celular structures during molding and curing will compress and de-aerate the enclosed cells. After curing of the laminated articles, the enclosed cells will remain compressed within the thermoset polyester resin.

While foamed polyurethane is the preferred material for the purposes of the present invention, other foamed plastics might be utilized so long as they (1) contain connected cells;
(2) are highly compressible;
(3) are flexible;
(4) are elastic;
(5) are readily wettable with the liquid polyester resins.

However, not all cellular plastic materials will behave as well as the foarmed polyurethane. For example, when the present process was carried out with foamed vinyl chloride sheets, there was virtually no absorption of the vinyl chloride cellular material into the resulting laminate since the vinyl chloride does not have sufficient wettability for the polyester resins. Similarly, when sheets of cellulose foam were utilized in the present process, the resulting laminates developed serious separations along the edges of the foamed cellulose an flaked badly over the surface, especially in the regions of rather large cells in the foamed cellulose. The cellular structure of the foamed cellulose, in general, is not as uniform as that which can be available with foamed polyurethane. Cellulose foam is less readily compressed than the foamed polyurethane. Its wettability for the polyester resin is significantly less than that of the foamed polyurethane.

Where the present polyurethane foam sheets are provided over less than the entire surface of a glass-fiber-reinforced article, there is no separation along the edge portions of the area where the foamed polyurethane is positioned. This lack of separation is desirable and is significantly in contrast to the severe separation which has been observed when foamed cellulose sheets were provided under similar processing conditions.

It is also possible to utilize different types of polyester resins within a laminated article according to this invention. Resins which are especially adapted to bonding with glass-fiber mats, for example, may be applied as a layer in conjunction with the glass mats; suitably pigmented polyester resins of another formulation may be applied in conjunction with the foamed polyurethane. The polyester resins which have been utilized in accordance within invention include maleic anhydride-phthalic anhydride-propylene glycol polyesters dissolved in styrene or vinyl toluene. About 35 parts by weight of the resultant unsaturated polyester resin composition is the styrene or vinyl toluene.

While the foregoing specification has principally concerned unsaturated polyester resins, I am aware that certain glass-fiber reinforced articles are laminated with other types of thermosetting resins. For example, acrylic syrups, epoxy resins, polyamide resins, silicone resins, and non-foaming polyurethane resins have been utilized in the past as a thermosetting resin for glass-fiber-reinforced laminated articles. The process of the present invention is equally applicable to laminates which are formed from these other liquid thermosetting resins for which the foamed plastic sheet is wettable.

I claim:
1. A reinforced laminated article having a glass-fiber mat, a resilient sheet of flexible foamed polyurethane having connected open cells and an unsaturated polyester resin filler disposed throughout the interstices of said mat and said sheet, the said sheet being disposed over one exposed surface of the said article, said unsaturated polyester resin being cured to a thermoset condition while the said article is maintained under compression whereby the said connected open cells of the said foamed polyurethane sheet are compressed and entirely filled with the said unsaturated polyester resin and the said sheet is substantially flattened from its initial uncompressed thickness.

2. The reinforced laminated article of claim 1 wherein a sheet of the said foamed polyurethane is provided over each side of the said glass-fiber mat.

3. The reinforced laminated article of claim 1 wherein the said polyurethane sheet has its said connected open cells of average diameter in the range of 0.001 to 0.5 inch.

4. The reinforced laminated article of claim 1 wherein the said foamed polyurethane sheet has a normal, uncompressed thickness in the range of 0.05 to 2.0 inches.

5. A reinforced laminated article having
   a glass-fiber mat,
   a resilient sheet of flexible foamed plastic material having connected open cells of substantially uniform diameter and being from 0.05 to 2.0 inches in thickness, said sheet being highly compressible and wettable with liquid thermosetting resinous material, the said sheet being disposed over one exposed surface of the said article, and
   a unitary mass of a non-foaming thermoset resinous material filling the interstices of said glass-fiber mat and the said connected open cells of said sheet, said resinous material being cured to a thermoset condition while the said article is compressed whereby the said sheet is substantially flattened from its initial uncompressed thickness.

6. The reinforced article of claim 5 wherein the said resinous material is unsaturated polyester resin.

7. The reinforced article of claim 5 wherein the said foamed plastic material is foamed polyurethane.

8. The method of preparing laminated articles which comprises positioning a glass-fiber mat on a first molding surface, positioning a resilient sheet of flexible foamed polyurethane over the said glass-fiber mat, engulfing the said mat and the said sheet with liquid unsaturated polyester resin, the said sheet being in contact over substantially its entire surface with a second molding surface which is complementary to the said first molding surface compressing the said sheet and the said mat between the two said molding surfaces, curing the said unsaturated polyester resin to a thermoset condition while the said mat and the said sheet are maintained under compression, whereby the said sheet is substantially flattened from its initial uncompressed thickness, the said unsaturated polyester filling the interstices of the said mat and the cells of said sheet during the said heating, and recovering a laminated article from the said mold.

9. The method of preparing laminated articles which comprises preparing a sandwich consisting of a glass-fiber mat between two resilient sheets of flexible foamed plastic material having connected open cells of substantially uniform diameter in the range of 0.001 to 0.5 inch, being highly compressible and wettable with liquid non-foaming thermosetting resinous material, positioning the said sandwich within a mold, engulfing the contents of the said sandwich with a liquid thermosetting resinous material which will wet the said foamed plastic material, compressing the said sandwich in the said mold, curing the said resinous material to a thermoset condition while the said sandwich is maintained under compression, whereby the said sheet is substantially flattened from its initial uncompressed thickness, the said resinous material filling the interstices of the said sandwich during the said heating, and recovering a laminated article from the said mold, the said article having exposed surfaces comprised of the said sheets in compressed form.

10. The method of claim 9 wherein the said foamed plastic material is foamed polyurethane.

11. The method of claim 9 wherein the said resinous material is unsaturated polyester resin.

12. The method of claim 9 wherein at least one of the said sheets of foamed plastic material covers less than the entire surface of said glass-fiber mat.

13. A laminated article including a resilient sheet of flexible foamed polyurethane having open, connected cells, and having its interstices substantially entirely filled with a non-foaming thermosetting resinous material in a thermoset condition, the said sheet being substantially flattened from its initial uncompressed thickness and being confined adjacent to one exposed surface of the said laminated article in the substantially flattened condition whereby the said sheet introduces a visually pleasing grainy appearance to the said exposed surface of the said article.

References Cited by the Examiner
UNITED STATES PATENTS

| | | |
|---|---|---|
| 1,427,754 | 8/22 | Gibbons _____ 161—159 |
| 2,001,916 | 5/35 | Mazer _____ 161—159 X |
| 2,185,586 | 1/40 | Brooks _____ 161—159 |
| 2,463,550 | 3/49 | Myerson et al. _____ 161—159 X |
| 2,744,047 | 5/56 | Ingrassiu et al. _____ 156—311 |
| 2,806,256 | 9/57 | Smith-Johannsen. |
| 2,863,797 | 12/58 | Meyer. |
| 2,927,876 | 3/60 | Hoppe et al. _____ 161—159 X |
| 2,959,511 | 11/60 | Finger. |

EARL M. BERGERT, *Primary Examiner.*

CARL F. KRAFFT, *Examiner.*